United States Patent [19]

Angelle et al.

[11] 4,172,917
[45] Oct. 30, 1979

[54] DUAL-PURPOSE TEMPORARY CARPET AND CARPET UNDERLAY CONSTRUCTION AND METHOD OF MAKING SAME

[75] Inventors: Daniel A. Angelle, Centerville, Ohio; James P. Nolan, Chester, Va.; Doyle V. Haren, Clyde, N.C.

[73] Assignee: Dayco Corporation, Dayton, Ohio

[21] Appl. No.: 846,857

[22] Filed: Oct. 31, 1977

[51] Int. Cl.² .............................................. B32B 29/00
[52] U.S. Cl. ........................................ 428/95; 156/72; 156/306; 428/246; 428/247; 428/257; 428/258; 428/282; 428/287; 428/315
[58] Field of Search ................. 428/95, 246, 247, 257, 428/258, 282, 287, 315; 156/72, 306

[56] References Cited

U.S. PATENT DOCUMENTS 3,822,176  7/1974  Harrison .............................. 156/72

FOREIGN PATENT DOCUMENTS 1373619  11/1974  United Kingdom ..................... 428/95

Primary Examiner—Marion E. McCamish
Attorney, Agent, or Firm—Reuben Wolk

[57] ABSTRACT

A dual-purpose temporary carpet and carpet underlay construction and method of continuously making such construction are provided wherein the construction comprises a top decorative wear layer, a latex foam cushion, and a copolymer latex adhesive bonding the wear layer and latex foam cushion with the decorative wear layer enabling the construction to be useable as a temporary carpet and with the construction being useable as an underlay for a carpet.

16 Claims, 6 Drawing Figures

DUAL-PURPOSE TEMPORARY CARPET AND CARPET UNDERLAY CONSTRUCTION AND METHOD OF MAKING SAME

BACKGROUND OF THE INVENTION

The usual practice in the carpet industry where cushioned carpets are employed is to provide a permanent carpet having cushioning material defined as an integral part thereof or to provide a permanent carpet which employs a separate comparatively inexpensive underlay cushion. Inherent in these techniques is the necessity of selecting a final carpet design and installing the same without the benefit of first trying a particular carpet color, style, design, or the like, to assure the carpet selected is the desired choice.

In addition there are numerous applications where it is desired to enhance a particular area with a cushioned carpet yet where cost considerations prohibit the provision of a permanent carpet. Further, the carpet underlays presently available on the market are not satisfactory as primary floor coverings even on a temporary basis.

SUMMARY

It is a feature of this invention to provide a dual-purpose temporary carpet and carpet underlay construction wherein such construction comprises a top decorative wear layer, a latex foam cushion, and a copolymer latex adhesive bonding the wear layer and latex foam cushion with the decorative wear layer enabling the construction to be useable as a temporary carpet and with the construction being useable as in underlay for a carpet.

Another feature of this invention is to provide a construction of the character mentioned wherein the wear layer thereof is made of a non-woven material and preferably in the form of a stitch-bonded polyester.

Another feature of this invention is to provide a construction of the character mentioned wherein such wear layer is a decorative layer provided with an inexpensive attractive design employing dye-printing, and the like.

Another feature of this invention is the provision of a construction of the character mentioned wherein the copolymer latex adhesive bonding the wear layer to the latex foam cushion is in the form of an adhesive layer serving as dirt and a moisture barrier for said latex foam cushion.

Another feature of this invention is to provide a construction of the character mentioned in which said latex foam cushion is made of styrene-butadiene rubber.

Another feature of this invention is to provide a construction of the character mentioned which is useable as a temporary primary floor covering with minimum likelihood of damage thereto.

Another feature of this invention is to provide a method of continuously making a dual-purpose temporary carpet and carpet underlay construction of the character mentioned.

Accordingly, it is an object of this invention to provide a dual-purpose temporary carpet and carpet underlay construction and method of continuously making such construction having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
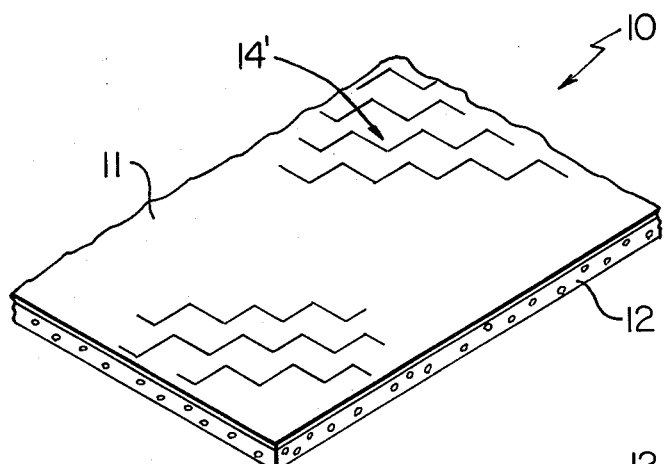
FIG. 1 is a fragmentary perspective view illustrating one exemplary embodiment of a dual-purpose temporary carpet and carpet underlay construction of this invention.

Reference is now made to FIG. 1 of the drawings which illustrates one exemplary embodiment of a dual-purpose temporary carpet and carpet underlay construction of this invention which is designated generally by the reference numeral 10. The construction 10 is particularly adapted to be used in applications where it is desired for temporary time periods of a few months, for example, to provide a primary floor covering having the luxurious appearance of a carpet yet at minimum cost approximating the cost of a carpet underlay. Further, such construction is useable as a high quality underlay whether or not it is used as a temporary carpet.

Figure 2:
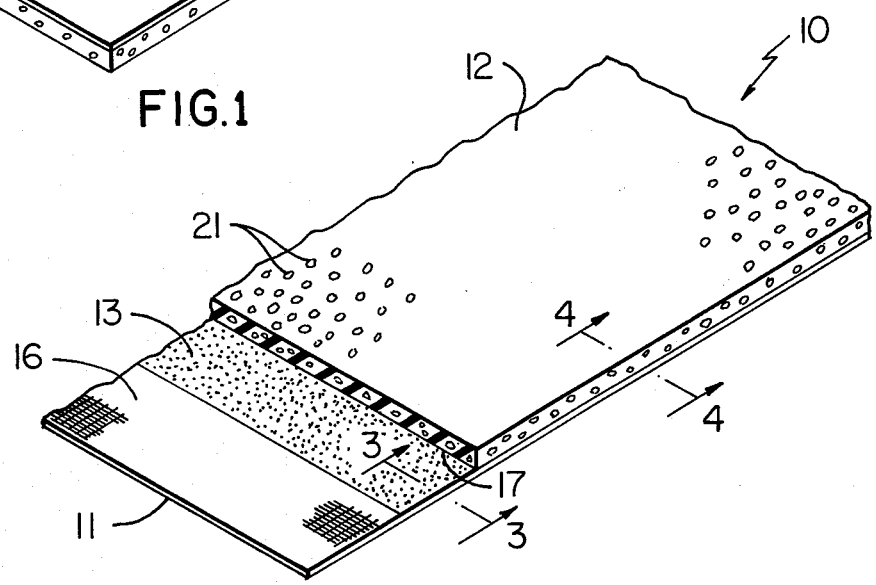
FIG. 2 is a fragmentary perspective view of the construction of this invention inverted and with portions broken away to highlight the construction of a wear layer, copolymer latex adhesive, and latex foam cushion thereof.

As best seen in FIG. 2 the construction 10 comprises a top decorative wear layer 11, a latex foam cushion 12, and a copolymer latex adhesive 13 preferably in the form of a layer bonding the wear layer 11 and the latex foam cushion 12 so as to provide a tenacious bond therebetween. The decorative wear layer 11 enables the construction to be useable as a temporary main carpet or primary floor covering and such wear layer is both decorative and easy to clean with an ordinary sweeping implement, vacuum, or the like.

The wear layer 11 is preferably made of any suitable inexpensive non-woven fabric material and one example of a material which has been used successfully is a stitch-bonded polyester. The stitch-bonded polyester fabric lends itself to the application of decorative colors, design patterns, and the like, and an exemplary decorative pattern is shown at 14' in FIG. 1. To keep costs at a minimum dye-printing techniques used in the carpet industry may be employed to provide the desired decorative effect.

Figure 5:
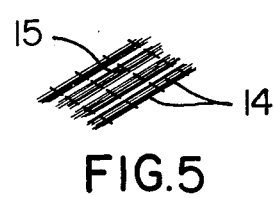
FIG. 5 is an enlarged fragmentary plan view of the wear layer of the carpet construction of FIG. 1.

As best seen in FIG. 5 of the drawings, the stitch bonded polyester layer is comprised of a plurality of parallel fiber lengths, a representative few of which have been designated by the same reference numeral 14, which are disposed in parallel relation to define what may be considered the equivalent of the warps of the layer 11. The fiber lengths 14 may be defined in accordance with any suitable technique known in the art and are held together by stitch bonding comprised of stitches 15 which may be considered interlocking wefts 15 disposed transverse (perpendicular in this example) the parallel fibers 14 to define the stitch bonded pattern whereby the wear layer 11 is of minimum cost.

Figure 3:
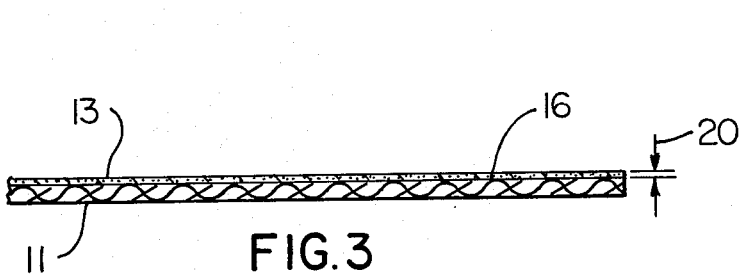
FIG. 3 is a fragmentary cross-sectional view taken essentially on the line 3—3 of FIG. 2.
Figure 4:
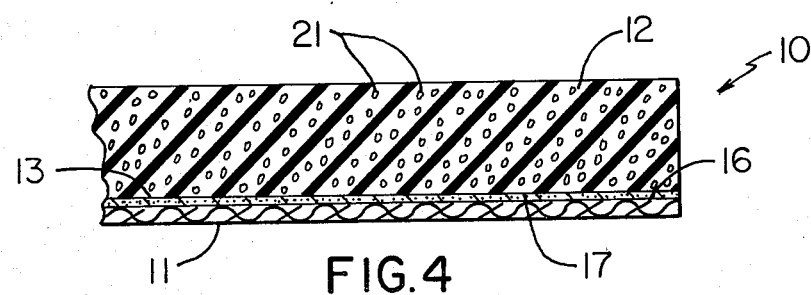
FIG. 4 is a fragmentary cross-sectional view taken essentially on the line 4—4 of FIG. 2.

The copolymer latex adhesive 13 (FIGS. 2-4) is used to bond the wear layer 11 by bonding the inside surface 16 of layer 11 to the inside surface 17 of the latex foam cushion 12 and layer 13 may be any suitable copolymer latex adhesive including carboxylated latex, vinyl latex, acrylonitrle latex, styrene-butadiene rubber latex, and the like. The adhesive 13 is disposed on the wear layer 11 so that it has a thickness 20 and such thickness not only enhances the strength of the wear layer 11 but serves to define what may be considered a dirt and moisture barrier for the latex foam cushion 12.

The latex foam cushion 12 may be made using foamed polymeric compounds, including natural rubber, neoprene rubber, and the like. However, preferably such latex foam cushion 12 is preferably made utilizing styrene-butadiene rubber which will be referred to hereinafter as SBR. The latex foam cushion is preferably made from a composition comprised of SBR, a surfactant, a curing agent, and a filler. The various constituents of such a composition and the preferred ranges of such constituents will be presented in detail subsequently. However, regardless of such constituents it will be appreciated that the latex foam cushion has substantially uniformly dispersed voids 21 therein which impart a yield and springiness underfoot which gives the construction 10 the feel of an expensive luxurious carpet yet at a minimal cost approaching the cost of the usual ordinary carpet underlay which would not be satisfactory as a carpet underlay.

Figure 6:
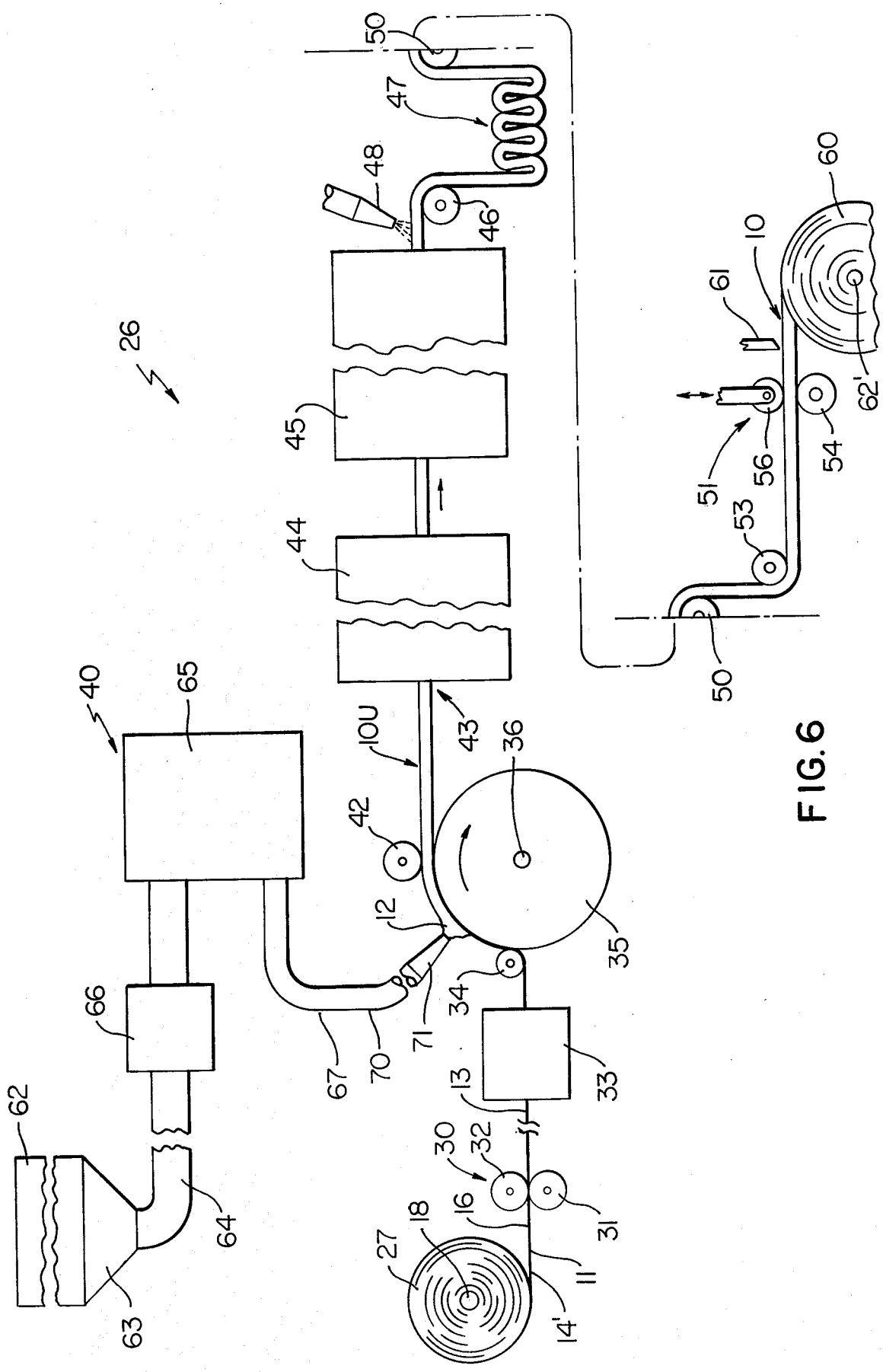
FIG. 6 is a primarily schematic presentation with parts broken away illustrating one exemplary embodiment of the apparatus and method which may be employed in making the construction of FIG. 1.

Having described the construction 10 of this invention reference is now made to FIG. 6 of the drawing which illustrates one exemplary embodiment of an apparatus and method which is designated generally by the reference numeral 26 and which may be employed to make the construction 10 of this invention. In particular, it will be seen that a web of wear material designated by the reference numeral 11 and having a bottom surface 16 and a top decorative surface 14' (also see FIG. 1) is provided on a supply roll 27 thereof which is suitably supported for unwinding rotation on a shaft 18. The web 11 of this example is wound so that its bottom surface 16 faces upwardly as it is moved through an adhesive application station which is designated by the reference numeral 30.

At station 30 suitable means is employed to apply the previously described copolymer latex adhesive 13, to define a layer thereof; and, in this example the adhesive layer is applied employing a backup roll 31 and an adhesive applicator roll 32. The adhesive applicator roll 32 may be supplied with adhesive from any suitable source and employing any suitable technique known in the art.

The web with the copolymer latex adhesive 13 applied thereon is subjected to a drying environment which may be simply room temperature whereby a sufficient length of the adhesive coated web, as it is moved continuously from the station 30 to the next station, is exposed to normal ambient room temperature for a sufficient time period to allow drying of the copolymer latex adhesive to provide a top outer surface skin thereon. If desired, the partial drying of the latex adhesive 13 to provide the outer skin thereon may be achieved in a suitable drying apparatus 33 which may be in the form of a heat tunnel, oven, or the like.

The web 11 with adhesive 13 thereon then moves around a turn roll 34 and over a comparatively large diameter web support and driving roll 35 which is supported for rotation about a central horizontal shaft 36. The roll 35 has radially projecting pins (not shown) which are disposed at opposite side edges of the roll 35 and engage the web 11. The projecting pins operate in a manner which is known in the art and pull the web 11 from the supply roll 27 causing unwinding rotation thereof. The web 11 is supported by roll 35 so that latex foam, also designated by the reference numeral 12, may be applied thereon to define a layer. The latex foam 12 is provided by a suitable foaming apparatus designated generally by the reference numeral 40 and such latex foam 12 is provided on the web 11 while it is continuously moved by the roll 35. The latex foam 12 is smoothed by what may be considered a latex foam height control means in the form of a nip roll 42 which is rotatably supported above the roll 35 and substantially vertically above the central longitudinal axis of the roll 35. The nip roll 42 serves to define a controlled height for the latex foam which upon curing thereof defines the latex foam cushion 12.

The web 11 with the copolymer latex adhesive 13 thereon and latex foam of predetermined height defines an uncured construction designated 10U and is moved as shown at 43 into a heating apparatus popularly referred to as a gel oven 44. Although the oven 44 may be of any suitable type known in the art, in one application of this invention such oven utilizes electrical heating elements such as resistance heating elements to provide a substantially instantaneous high heat on the uncured carpet construction 10U. The oven 44 provides initial gelling of the latex foam and after such gelling the uncured construction 10U is moved into an oven or tunnel 45 to complete the curing thereof and define the construction 10.

The gel oven 44 in one example of the invention provides heating over a horizontal length of approximately 12 feet and after exiting the gel oven 44 the uncured construction 10U is moved into the curing oven 45 which is approximately 200 feet in length. The oven 45 provides circulating hot air curing of the construction 10U and oven 45 may be heated by natural gas, propane gas or the like. The construction 10U may be moved through oven 45 in a double pass whereby each increment construction 10U is subjected to 400 feet of hot curing environment to define the construction 10.

The construction 10 is then moved around a turn roll 46 into an accumulating station 47 where air cooling of the construction 10 takes place. The accumulation of construction 10 at station 47 enables continuous production of the construction 10 to take place. It will be appreciated that if desired, a cooling apparatus such as a cooling air nozzle 48 may be provided upstream of station 47 to provide cooling of construction 10.

The construction 10 is moved from station 47 around a turn roll 50 and into a cutting station 51; and, the movement of the construction 10 to the cutting station may be achieved using any suitable means known in the art. In particular, the construction 10 after movement around turn roll 50 is moved around another turn roll 53 and then horizontally to the cutting station 51. At the cutting station 51 any suitable technique may be employed to trim the side edges of the construction 10. For example, a backup roll 54 may be provided to support the construction 10 and a pair of spaced apart rotary cutters such as rotary cutting knives 56 used to provide the trimming action.

The construction 10 with its side edges trimmed is then wound in coil form to define a supply roll 60 thereof. A predetermined length of carpet construction 10 defines the roll 60 and once such length has been processed and trimmed a suitable cutter 61 is provided to cut transverse the construction 10 across its full width. After cutting the then free leading end portion is wound on another core member 62' to define another supply roll 60.

The constituents of the composition used to define the latex foam 12 are suitably provided and mixed as is known in the art by mixer 62 comprising the apparatus 40. The mixer may be in the form of a so-called vertical paddle mixer 62 and the mixed material exits a substantially frustoconical bottom portion 63 and is moved through a pipe 64 to a foaming unit or foamer 65. Suitable filtering means such as a filter 66 is installed in the pipe 64 to assure that the thoroughly mixed composition is free of impurities or the like. The foaming unit 65 may be of any suitable type known in the art and basically such unit introduces air into the composition so that such air is uniformly dispersed therethrough. One foaming unit which has been used successfully is referred to as an Oakes Foamer and manufactured and sold by the Oakes Machine Company, 26 Cammock Road, Islip, Long Island, N.Y., 11751.

The latex foam exits the foamer 65 through a conduit system 67 which has a flexible conduit portion 70 provided at the terminal end of the conduit 67. The flexible conduit portion 70 has an exit nozzle 71; and, in operation as the web 11 is moved over the roll 35 foam 12 is introduced thereon at a location between the 9 o'clock and 12 o'clock positions of the roll 35 through the nozzle 71. The flexible portion 70 enables the nozzle 71 to be moved across the roll 35 parallel to its horizontal longitudinal axis to assure that foam 12 is provided substantially uniformly thereacross whereby the nip roll 42 serves to assure the provision of the desired thickness of latex foam in the manner previously described. The flexible end portion 70 and nozzle 71 may be moved manually by an operator or may be moved employing automatic or semiautomatic means provided with suitable controls.

As previously mentioned the composition defining the latex foam is preferably comprised of SBR, a surfactant, a curing agent, and a filler and reference is now made to Table I which lists the constituents of a particular example of a composition which has been used to define the latex foam cushion 12 of construction 10. In Table I the SBR latex, surfactant, curing agent, and filler are shown as items 1, 2, 6, and 7-8 respectively.

TABLE I

| Item | Constituents | Parts by Weight |
|---|---|---|
| 1. | Styrene-Butadiene Rubber | 100.0 |
| 2. | Disodium N-Octadecyl Sulfosuccinamate | 3.5 |
| 3. | Potassium Hydroxide Solution | 0.60 |
| 4. | Water | 3.00 |
| 5. | Tri-Sodium Phosphate Solution | 0.32 |
| 6. | Curing Agent | 9.80 |
| 7. | Alumina Tri-Hydrate | 60.00 |
| 8. | Calcium Carbonate | 60.00 |
| 9. | Ammonium Hydroxide | 1.4 |
| 10. | Sodium Laurel Sulfate | 0.90 |

NOTE:
Item 6 curing agent comprised of the following contituents by weight:
Sulfur 1.5, Ethyl Zimate 1.5, Zenite 1.5, and Zinc 3.0

Table I presents a specific example of a composition which has been provided to define latex foam cushion 12; however, only certain components are essential to the composition and these are items 1, 2, 6, 7 and 8. Table II is a presentation of only these essential items with a showing of the range of the number of parts by weight which may be provided.

TABLE II

| Essential Constituents | Range of Parts by Weight |
|---|---|
| Latex—Styrene-Butadiene Rubber | 100.0–115.0 |
| Surfactant—Disodium N-Octadecyl Sulfosuccinamate | 3.0–8.0 |
| Curing Agent | 9.0–12.0 |
| Filler—Alumina Tri-Hydrate | 30.–100.0 |
| Filler—Calcium Carbonate | 30.0–100.0 |

The alumina tri-hydrate identified as a filler in Table II serves a fire retardant while the calcium carbonate also identified as a filler serves as a whiting agent. The two constituents together may be identified simply as the filler and varied in amounts so that they comprise from 60 to 200 parts by weight of the overall composition.

As previously indicated the wear layer 11 is preferably made of a stitch bonded polyester and one example of a material which has been satisfactorily used is a polyester material which is easily ink dyed and has a weight of 4 oz. per square yard and is sold by the Tietex Corporation of Spartanburg, S.C.

Similarly, a copolymer latex adhesive which has been satisfactorily employed is carboxylated SBR latex.

The foam latex itself is made from the constituents indicated previously and although any suitable curing agent may be used a curing agent sold under the trade designation Vulcrite 699 by Also Chemical Company, Philadelphia, Pa. has been used successfully.

In any event it will be appreciated that dual-purpose temporary carpet and carpet underlay construction 10 of this invention preferably has an overall thickness generally of the order of ¼ to ¾ inch with the wear layer 11 having a thickness generally of the order of 0.030 inch, the adhesive 13 having a thickness generally of the order of 0.005 inch, with the balance of thickness being the latex foam cushion 12.

While present exemplary embodiments of this invention, and methods of practicing the same, have been illustrated and described, it will be recognized that this invention may be otherwise variously embodied and practiced within the scope of the following claims.

What is claimed is:

1. A dual-purpose temporary carpet and carpet underlay construction comprising, a top decorative fabric wear layer, a latex foam cushion, and a copolymer latex adhesive bonding said wear layer and latex foam cushion, said decorative fabric wear layer enabling said construction to be useable as said temporary carpet and said construction being useable as an underlay for a carpet.

2. A construction as set forth in claim 1 which has an overall thickness generally of the order of ¼ to ¾ inch and wherein said wear layer has a thickness generally of the order of 0.030 inch, said adhesive is a layer thereof having a thickness generally of the order of 0.005 inch, and the balance of said overall thickness is said latex foam cushion.

3. A construction as set forth in claim 2 in which said layer of adhesive enhances the strength of said fabric wear layer and serves as a dirt and moisture barrier for said latex foam cushion, and said top decorative fabric wear layer is a stitch bonded fabric comprised of a plurality of parallel fiber lengths disposed to define the equivalent of warps of said wear layer, said fiber lengths being held together by stitches disposed transverse the parallel fiber lengths to define the equivalent of interlocking wefts.

4. A construction as set forth in claim 3 in which said top decorative fabric wear layer is a dye-printed stitch bonded polyester material.

5. A construction as set forth in claim 1 in which said latex foam cushion is defined from a composition comprised of, styrene-butadiene rubber, a surfactant, a curing agent, and a filler; said styrene-butadiene rubber comprising between 100 and 115 parts by weight of said composition, said surfactant comprising between 3 and 8 parts by weight of said composition, said curing agent comprising between 9 and 12 parts by weight of said composition, and said filler comprising between 60 and 200 parts by weight of said composition.

6. A construction as set forth in claim 5 in which said curing agent is comprised of sulfur, ethyl zimate, zenite, and zinc.

7. A construction as set forth in claim 5 in which said surfactant is in the form of disodium N-octadecyl sulfosuccinamate.

8. A construction as set forth in claim 5 in which said filler is comprised of a fire retardant in the form of alumina tri-hydrate and a whiting material in the form of calcium carbonate, said alumina tri-hydrate and calcium carbonate being in the range of 30 to 100 parts by weight each of said composition.

9. A method of continuously making a dual-purpose temporary carpet and carpet underlay construction comprising, supporting a web of fabric wear material on a supply roll thereof for unwinding rotation, said web having a top decorative surface and a bottom surface, applying a layer of a copolymer latex adhesive on said bottom surface, partially drying said layer of adhesive to provide a skin thereon to enable further processing of said web with said adhesive thereon, disposing said web on a web support and driving roll, said web support and driving roll engaging said web and serving to pull same from its supply roll causing unwinding rotation from said supply roll, disposing a latex foam against said adhesive layer while said web is supported on said web support and driving roll, smoothing said latex foam while it is backed by said web support and driving roll to provide a controlled thickness of latex foam on said web and adhesive, and curing said latex foam and adhesive to complete said construction wherein said layer of adhesive enhances the strength of said fabric wear layer and serves as a dirt and moisture barrier for said latex foam cushion, said web defines a decorative fabric wear layer which enables said carpet construction to be useable as said temporary carpet, and said construction is useable as an underlay for a carpet.

10. A method as set forth in claim 9 and comprising the further step of dye printing said top decorative surface on said fabric wear layer.

11. A method as set forth in claim 9 in which said curing step comprises curing said latex foam and adhesive initially in a gelling oven and subsequently in a curing oven.

12. A method as set forth in claim 9 and comprising the further step of cooling said construction after curing thereof.

13. A method as set forth in claim 9 in which said smoothing step comprises employing a nip roll to provide said controlled thickness.

14. A method as set forth in claim 13 in which said disposing step comprises conveying said latex foam through a flexible nozzle.

15. A method as set forth in claim 9 and comprising the further step of trimming the side edges of said construction.

16. A method as set forth in claim 9 in which said disposing step comprises providing said latex foam by mixing styrene-butadiene rubber latex, a surfactant, a curing agent, and a filler.

* * * * *